(12) United States Patent
    Dickinson

(10) Patent No.: US 10,166,931 B2
(45) Date of Patent: Jan. 1, 2019

(54) SUPPORT BARS AND CYCLE CARRIERS

(71) Applicant: C.P. Witter Limited, London (GB)

(72) Inventor: Martin Ian Dickinson, Flintshire (GB)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 15/119,756

(22) PCT Filed: Feb. 17, 2015

(86) PCT No.: PCT/GB2015/050454
    § 371 (c)(1),
    (2) Date: Aug. 18, 2016

(87) PCT Pub. No.: WO2015/124915
    PCT Pub. Date: Aug. 27, 2015

(65) Prior Publication Data
    US 2017/0066385 A1  Mar. 9, 2017

(30) Foreign Application Priority Data
    Feb. 18, 2014 (GB) .................................. 1402811.2

(51) Int. Cl.
    *B60R 9/10*     (2006.01)
    *F16B 2/08*     (2006.01)
    *F16B 2/18*     (2006.01)

(52) U.S. Cl.
    CPC .................. *B60R 9/10* (2013.01); *F16B 2/08* (2013.01); *F16B 2/185* (2013.01)

(58) Field of Classification Search
    CPC ... F16B 2/08; F16B 2/185; B60R 9/10; B60R 9/06; B60R 9/048
    (Continued)

(56) References Cited

U.S. PATENT DOCUMENTS 5,282,555 A * 2/1994 Muir ......................... B60R 9/10
                                                     224/532
5,505,357 A * 4/1996 Chimenti .................. B60R 9/06
                                                     224/314
(Continued)

FOREIGN PATENT DOCUMENTS

DE    9214916 U1   12/1993
WO    03106221 A1  12/2003

OTHER PUBLICATIONS

ISA / EPO, International Search Report and Written Opinion prepared for PCT/GB2015/050454, dated May 13, 2015.

*Primary Examiner* — Patrick D Hawn
(74) *Attorney, Agent, or Firm* — McDonald Hopkins LLC

(57) ABSTRACT

A cycle carrier support bar has a cycle end grip device (4) at a first end of a tubular spacer bar (2) and a carrier end grip device (5) at the second end. The cycle end grip device can be a flexible strap (42) with a tensioning lever (43) and a key-operated lock (6). The carrier end grip device (5) can be a rigid clamp with opposed jaws (51,52) connected at a pivot (54) and closed releasably by a latch mechanism operated by a longitudinally-slidable carrier shuttle (55) carrying a detent of the latch. The latch is released to open the carrier end grip device (5) by pulling on the wire of a Bowden cable (8) which extends along the middle of the tubular spacer bar, and has an actuating lever (7) exposed through a window in the cycle end grip (4), so as to be accessible only when the cycle end grip (4) is open.

21 Claims, 7 Drawing Sheets

(58) Field of Classification Search
USPC .......................................................... 224/924
See application file for complete search history.

(56) References Cited

U.S. PATENT DOCUMENTS

| | | | | |
|---|---|---|---|---|
| 5,509,776 A * | 4/1996 | Specht | .................... | B60R 9/042 |
| | | | | 224/319 |
| 5,598,959 A * | 2/1997 | Lorensen | ................ | B60R 9/045 |
| | | | | 224/315 |
| 5,645,202 A * | 7/1997 | Kaloustian | ............... | B60R 9/06 |
| | | | | 224/314 |
| 5,820,002 A * | 10/1998 | Allen | ........................ | B60R 9/10 |
| | | | | 211/70 |
| 6,283,349 B1 * | 9/2001 | Morris | .................... | B60R 9/048 |
| | | | | 224/502 |
| 6,431,423 B1 * | 8/2002 | Allen | ........................ | B60R 9/048 |
| | | | | 224/324 |
| 6,494,351 B1 * | 12/2002 | Dean | ........................ | B60R 9/048 |
| | | | | 224/324 |
| 6,503,019 B1 * | 1/2003 | Wang | ........................ | B62J 99/00 |
| | | | | 224/501 |
| 6,602,015 B1 * | 8/2003 | Evans | .................... | B60R 9/048 |
| | | | | 224/924 |
| 6,732,893 B2 * | 5/2004 | Morris | .................... | B60R 9/048 |
| | | | | 224/502 |
| 7,234,617 B2 * | 6/2007 | Weaver | .................... | B60R 9/048 |
| | | | | 224/315 |
| 7,757,917 B2 * | 7/2010 | Bogoslofski | .............. | B60R 9/06 |
| | | | | 224/533 |
| 8,025,196 B2 * | 9/2011 | Flaherty | .................... | B60R 9/06 |
| | | | | 224/532 |
| 8,038,106 B2 * | 10/2011 | Magno, Jr. | ................ | F16B 2/10 |
| | | | | 248/228.1 |
| 8,210,407 B2 * | 7/2012 | Sautter | .................... | B60R 9/048 |
| | | | | 224/315 |
| 8,342,575 B2 * | 1/2013 | Coleman | .................. | A63C 5/16 |
| | | | | 24/298 |
| 8,348,113 B2 * | 1/2013 | Huang | .................... | B60R 9/10 |
| | | | | 224/567 |
| 8,393,506 B2 * | 3/2013 | Maim | ....................... | B60R 9/10 |
| | | | | 224/319 |
| 8,770,453 B2 * | 7/2014 | Lang | ........................ | B60R 9/10 |
| | | | | 224/315 |
| 9,649,987 B2 * | 5/2017 | Prescott | .................... | B60R 9/06 |
| 9,688,209 B2 * | 6/2017 | Cha | ........................ | B60R 9/048 |
| 2001/0025866 A1 * | 10/2001 | Morris | .................... | B60R 9/048 |
| | | | | 224/502 |
| 2002/0003156 A1 * | 1/2002 | Morris | .................... | B60R 9/048 |
| | | | | 224/553 |
| 2002/0047031 A1 * | 4/2002 | Ferman | .................... | B60R 9/06 |
| | | | | 224/497 |
| 2002/0117526 A1 * | 8/2002 | Anderson | ................. | B60R 9/06 |
| | | | | 224/536 |
| 2003/0042281 A1 * | 3/2003 | Ishikura | .................... | B60R 9/048 |
| | | | | 224/319 |
| 2005/0284905 A1 * | 12/2005 | Naslund | .................. | B60R 9/048 |
| | | | | 224/319 |
| 2006/0037986 A1 | 2/2006 | Wang | | |
| 2014/0239027 A1 * | 8/2014 | Dickinson | ................ | B60R 9/06 |
| | | | | 224/534 |

* cited by examiner

SUPPORT BARS AND CYCLE CARRIERS

CROSS REFERENCE TO RELATED APPLICATIONS

This application is a 35 U.S.C. 371 national stage filing and claims priority to International Application No. PCT/GB2015/050454 filed on Feb. 17, 2015, entitled "Support Bar and Cycle Carrier," which claims the benefit of British Patent Application No. 1402811.2 filed on Feb. 18, 2014, each of which is incorporated herein in its entirety by reference.

FIELD OF THE INVENTION

This invention has to do with support bars or retaining bars having grip devices, adapted for keeping objects held by the grip devices at a predetermined spacing from one another. We particularly propose support bars suitable for holding cycles in cycle carriers, and cycle carriers incorporating or including one or more of the support bars, although the concepts disclosed have broader uses.

BACKGROUND

It is known to carry bicycles on a vehicle using a cycle carrier, that is to say, a device which fixes (usually removably) to the vehicle and has a frame formed and adapted to support one or more bicycles stably. One known type, usually mounted at the rear of a vehicle using a towbar, has a frame including wheel supports on which the cycle wheels locate and rest, and a frame support portion, usually an upstanding frame portion, to which an upper part of the cycle frame is connected by a support bar to keep it upright.

Carriers to carry two or more cycles generally arrange them side by side (each cycle extending across the vehicle) using support bars to keep each cycle upright, stable and spaced from the adjacent carrier frame and cycle so as to avoid damage. Typically this is by a set of support bars of different lengths which each connect removably at one end (the "carrier end") to the frame support portion of the carrier, by means of a grip, clamp or holding device ("grip device" henceforth) and at the other end (the "cycle end") to a frame member of a respective cycle of the set by another grip device. The grip devices are part of the support bar. They may be the same or different at the cycle end and carrier end. See e.g. WO2006/004519.

In a cycle carrier it is difficult to combine convenience with security against theft. Some products provide key locking. An effective lock requires of course that both grip devices are locked. We note that these designs compromise or limit the speed of fastening and unfastening of the grip devices as well as the form and weight of the bar and the types of grip devices which can be used. See e.g. WO2009/065817.

THE INVENTION

The aim of our proposals is to provide new and useful lockable support bars, and cycle carriers using or incorporating them. Preferred embodiments of the invention provide for greater freedom of design in the form of the bar and in the types of grip devices which can be used, relative to known designs.

In a first aspect we provide a support bar having a first grip device and a second grip device fixed, at a longitudinal spacing, to a spacer bar. Typically they are at opposite ends of the spacer bar, but alternatively one or both might be at an intermediate position and/or there might be more than two. Each grip device typically has one or more relatively movable grip elements, movable between closed and open conditions or positions of the grip device;

a retainer mechanism engageable with one or more said relatively movable grip elements to keep the device in a closed condition, and a release actuator operable to disengage the retainer mechanism, for opening of the grip device.

The support bar desirably also comprises a key- or code-operated security lock mechanism to prevent opening of one or both grip devices.

A first proposal herein is that the release actuator for the second grip device comprises a flexible cable element, and most preferably the wire of a Bowden cable mounted in the spacer bar, which extends along inside the spacer bar to a release actuator member at a position remote from the retainer mechanism of the second grip device, preferably at the first grip device. The actuator member is operable to push or pull—preferably pull—the cable element along the spacer bar to release the retainer mechanism of the second grip device.

A second, related, proposal herein is that the release actuator for the second grip device comprises an elongate slider element which extends along inside the spacer bar to a release actuator member at a position remote from the retainer mechanism of that grip device, preferably at the first grip device. The actuator member is operable in a push or pull stroke to push or pull—preferably pull—the elongate slider element along the spacer bar to release the retainer mechanism of the second grip device. The push or pull stroke of the actuator member may be arcuate e.g. around a pivot or axis, but is e.g. not more than 180° of arc or rotation. That is, the sliding movement of the element is completely distinct from a screw movement. The actuator member is desirably a lever, push button or pull tag. The elongate element is preferably flexible.

The first and second proposals enable the second grip device to be released or opened remotely, e.g. from the first grip device, by a mechanism which can be operated in a simple movement and does not limit the form of the bar e.g. it can be curved or bent, or even non-rigid. This mechanism obviates the provision or operation of any manual actuator at the second grip device itself.

The first end of the elongate or cable element may be connected directly to the release actuator member, e.g. it may be pulled by a pivoted arm comprised in the release actuator member and which can be housed at the remote location. As mentioned this is preferably in a housing of the first grip device, but may be elsewhere e.g. in a separate security lock housing on the spacer bar where it is actuated directly by operating a security lock Desirably the release actuator of the second grip device has a return spring, preferably acting to pull the flexible cable or elongate element back along inside the spacer bar, e.g. from the position of the second grip device. This can restore it automatically to the detaining position after operation.

A third proposal herein relates to the situation in which the release actuator mechanism for the second grip device comprises a release actuator member which is at the first grip device. The release actuator mechanism may extend along the spacer bar as in the first and/or second proposals above, or some other remote actuation may be used. The third proposal is that the first grip device covers and/or disables and/or immobilises said second release actuator member when the first grip device is in a closed condition, a locked condition or a condition when the grip elements thereof are engaged with a gripped object (such as a frame bar). The release actuator member for the second grip device is desirably a lever, push button or pull tag. Preferably it is both covered (hidden) and prevented from use by features of the first grip device, in one of the specified conditions. In particular we prefer that a said grip element of the first grip device has a grip contact surface interrupted by a recess in a first grip device housing, which recess houses the release actuator member for the second grip device. Preferably this grip contact surface is on a grip element which is fixed relative to the spacer bar and opposed by a grip element which is relatively movable such as a strap, clamp element or jaw. The grip contact surface with the recess is desirably a concave surface. The grip contact surface desirably surrounds the recess.

In an alternative embodiment the release actuator member for the second grip device may be operated directly by a security lock comprised in the first grip device, e.g. as a driven element of that lock.

By this proposal a third party, perhaps attempting to interfere or steal, is prevented or hindered from seeing how to release and open the second grip device and/or from actually doing so, provided that the first grip device is closed or locked. Preferably the first grip device comprises a said security lock which operates to prevent opening thereof, preferably by preventing release of the retaining mechanism thereof. The second grip device is then effectively secured by the first so that only a single security lock is needed and, by implementing also the second or first proposal above, the second grip device can also be conveniently released from the first.

In any and all of the present proposals, preferably the first grip device comprises a flexible strap as a grip element. Preferably the strap is length adjustable, enabling articles of a range of sizes and shapes to be held in its partial or complete loop. A preferred form—known in itself—has a strap with a longitudinal series of recesses e.g. provided by a series of teeth such as directional (ratchet) teeth. A pivoted tensioning lever may be included, e.g. as known. The corresponding retaining mechanism can comprise a movable pawl or other toothed element engageable with the strap recesses where the strap passes through a control opening of a fixed housing portion of the grip device. The retaining mechanism may include a holding element, such as said tensioning lever in a closed position, to hold the toothed element in engagement. The first release mechanism operates to move the toothed element out of engagement, e.g. by pushing it directly or via a pivot using a first release actuator member which may be integral with it, e.g. a push-button. A security lock in the first grip device may have a driven element, such as a bolt, cam or other operating member which in the locked condition prevents movement of the strap or, more preferably, of the release mechanism relative to the housing.

The present preferred proposals are unique in enabling a strap-type first grip device, which is sympathetically adjustable in that it combines wide adjustment with low mechanical advantage so that it is not liable to damage valuable tubes, with remote and lockable release operation for the second grip.

Commenting generally on grip devices, the difference should be noted between grip devices of a fixed grip type and those of an adjustable grip type. The fixed grip type has a predetermined opening size/shape in the closed condition or position, assured by a stop or limit engagement between relatively movable elements of the device. Optionally also a lock or closure mechanism may operate only when this closed position is reached, so that for such a device there is effectively only a single closed position. Grip pressure—if any—on the retained object does not then vary according to user-applied force. Such a device is often preferred at the carrier end of a support bar because the dimension of the carrier frame is predetermined. Conversely an adjustable grip device is desirable at the cycle end because the support bar needs to be able to secure a range of different sizes and shapes of cycle frame members. Adjustable types includes straps as mentioned above, also a variety of screw-tightened clamps with separate or pivoted opposed clamp members or jaws as the grip elements. These are strong and reliable but difficult to lock, especially remotely, and have high mechanical advantage with the risk of damaging delicate objects.

In uses of the support bars other than in cycle carriers the same principles can be applied to the choice of grip devices according to the criteria in the field of use. In the present support bars we prefer grip devices shaped to grip an elongate bar-form object extending transversely to the spacer bar axis. Typically they have opposable grip elements or surfaces that are concave in one plane to conform to such objects, e.g. part-cylindrical, or are flexible.

We now consider the options and preferences for the second grip device in the present proposals.

While it may be adjustable, e.g. as for the preferred first grip device described above, we prefer that the second grip device is of the fixed grip type, closing to a predetermined aperture in the closed position.

For interaction with the remote release actuation proposals discussed above, it is preferred that the retaining mechanism for the second grip device includes a movable detent member that can be driven in the longitudinal direction of the spacer tube by the release actuator, e.g. in line with the spacer tube axis, and preferably retracted towards or into the spacer tube. Its movement is preferably against a restoring spring urging it to the detaining position. A corresponding movable grip element of the second grip device desirably comprises a catch portion, such as a projecting tongue, with a recess or abutment engageable by the detent member. This catch portion preferably moves transversely to the spacer tube axis (or longitudinal direction of the support bar) to and from its closed position where it is engageable by the detent member at a detent location. The grip device may define a shielded or enclosed path for insertion of the catch portion at the detent location, e.g. enclosed between fixed side guard portions of the grip device body, to prevent unauthorised interference with the retaining mechanism. One or both of the catch portion and the detent member may have an inclined cam surface where they engage so that they can be simply pushed into the retained closed position where a spring as mentioned engages the detent member automatically.

The movable grip element is preferably a pivoted rigid clamp portion or jaw member. A pair of opposed movable clamp or jaw elements may be used, but for retaining and locking purposes it is simpler and therefore preferred to have a single mobile clamp portion or jaw member acting against one which is fixed (relative to the spacer bar). This movable element can have the catch portion as mentioned. A preferred construction has a movable clamp element pivoted to a static clamp element at a pivot distal from the spacer bar, the free end of the movable clamp element comprising the catch portion which engages into the fixed construction to the detent location proximal to the spacer bar when swung closed.

The static grip element is preferably longitudinally fixed relative to the spacer bar, as distinct from the clamp in the device of WO2009/065817 which moves longitudinally into the bar as it closes.

The above proposals for the second grip device and its retaining and release mechanisms are a further independent aspect of our proposals.

Rigid grip elements may be made of any suitable material, e.g. tough moulded plastics such as nylon. Deformable or resilient liner elements such as elastomer liners may be provided on the contact surfaces to provide any of improved snugness of fit, rattle reduction, prevention of damage or increased friction to avoid sliding on a gripped bar.

Preferably one or both of the grip devices is mounted at the end of the spacer bar so as to be rotatable about its axis, facilitating fitting to variously angled frame tubes in different situations. The release actuating mechanisms described herein are well compatible with this movement. The grip devices may comprise plastics mouldings which fit rotatably into the open ends of the spacer bar, retained in place e.g. by an annular bead and groove connection The spacer bar is preferably a hollow tube, typically metal. It may be straight, or it may be curved or have a bend or angle, e.g. with at least 10° between the axes at the respective ends. Again, release actuating mechanisms described herein using flexible elements are well compatible with bent forms because unlike known mechanisms they can act around a bend. Bent/curved support arms are preferred for multi-cycle cycle carriers because they can more easily stand clear of intervening structures. Length may be conventional.

A security lock mechanism used herein may be of any appropriate type. Usually a mechanical key operating a rotatable lock barrel/plug is adequate and suitable, but other kinds of keys and locks e.g. with electronic, magnetic or radio-coded keys, combination locks, and electrically-powered mechanisms may be used if wished. Actuation of the lock with the appropriate key or code moves a driven element of the lock, such as a lock cam, bolt or the like, and this driver movement may actuate a release mechanism, or release a retaining mechanism or grip element, to permit opening.

A particularly preferred embodiment of our invention is a support bar, especially a cycle carrier support bar, comprising a first grip device and a second grip device fixed at opposite ends of a hollow spacer bar, wherein the first grip device comprises a housing, a flexible strap as a grip element and a lockable mechanism for holding a loop of the strap at any of a range of possible lengths;

the second grip device comprises a movable clamp element pivoted to a static clamp element at a pivot distal from the spacer bar, the free end of the movable clamp element comprising a catch portion, the second grip device further defining an enclosed detent location proximal to the spacer bar, the catch portion of the movable clamp element being engageable in the detent location when the movable clamp element is swung to a closed position;

the second grip device further comprising a detent member engageable with the catch portion of the movable clamp element to prevent its withdrawal from the detent location, thereby holding the second grip device in a closed condition, said detent member being mounted in the second grip device for longitudinal movement between a retracted condition and an advanced condition relative to the spacer bar;

an actuating cable mechanism extending along inside the spacer bar between the first and second grip devices, the actuating cable mechanism comprising an actuating wire connected at a first end to an actuating mechanism housed in the housing of the first grip device and at a second end to said detent member of the second grip device, said actuating mechanism being operable to pull on the actuating wire, retract the detent member and release the movable clamp element of the second grip device for opening.

Preferably the actuating mechanism is accessible only at an access opening in a grip contact surface of the first grip device.

Other preferred and optional features for this embodiment are as disclosed above, and in relation to the specific example described below.

The present support bars are applicable to adapt or enhance existing cycle carriers as well as potentially to other fields of use as mentioned above. They are therefore an independent product.

A further aspect of the invention however is a cycle carrier comprising a carrier frame and one or more support bars as disclosed above, the or each support bar being removably connectable to a support portion of the carrier frame by a said grip device thereof and preferably by the second grip device. Preferably the cycle carrier has wheel supports, preferably for plural cycles side by side, and an upstanding frame support portion such as a hoop portion with a frame portion such as a top rail portion to which the or each support bar is connectable. A cycle carrier for plural cycles preferably comprises a set of plural support bars of differing length. The carrier may be a towbar-mountable carrier.

DESCRIPTION OF AN EXAMPLE

Embodiments of our proposals are now described by way of example, with reference to the accompanying drawings in which.

Figure 1:
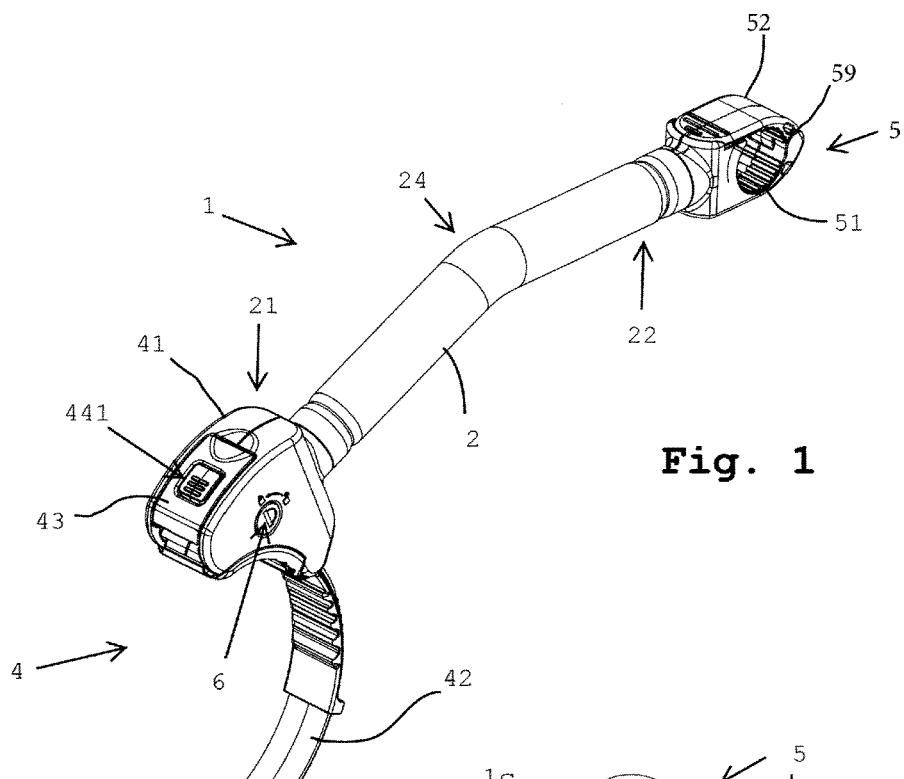
FIG. 1 is a general view of a support bar for a cycle carrier.

FIG. 1 shows a cycle carrier support bar 1 embodying our proposals. It consists generally of a spacer bar 2, typically of aluminium tube, with a cycle end (first) grip device 4 at a first end 21 and a carrier end (second) grip device 5 at the second end 22. The first grip device 4 is to hold a frame tube, e.g. the seat tube, saddle tube or crossbar, of a bicycle (not shown), and grips by means of a flexible strap 42 of adjustable length constituting a movable grip element. It includes retaining mechanism for the strap and a release actuator, including a tensioning lever 43 for tightening the strap around a tube, a release button 441 and a key-operated lock 6 for preventing release.

The second grip device 5 is a rigid clamp with a static jaw 51 and a mobile jaw 52 constituting a movable grip element, connected at a distal pivot 59 and closable to define a circular opening to fit on a support frame portion of a cycle carrier.

Figure 2:
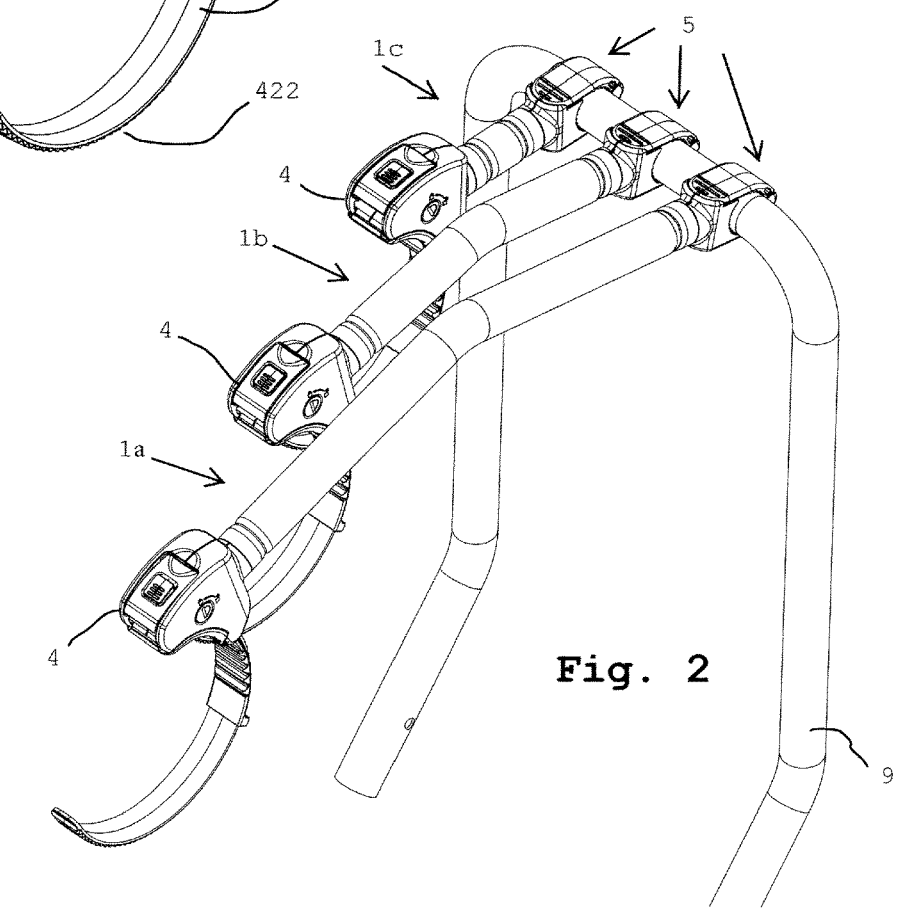
FIG. 2 shows a set of support bars mounted on a carrier frame (shown partially and schematically)

The cycle carrier may be of any known type: FIG. 2 shows schematically an upstanding frame portion 9 of a cycle carrier which typically will also comprise a lower portion having wheel supports. FIG. 2 also shows how, for a multi-cycle carrier, a set of the support bars 1a,1b,1c of different lengths is provided, for attaching them respectively to the support frame 9 at different distances.

FIGS. 1 and 2 also show a central bend or crank 24 in the support bar (although not the shortest one 1c) which helps to reach over intervening cycles.

Figure 3:
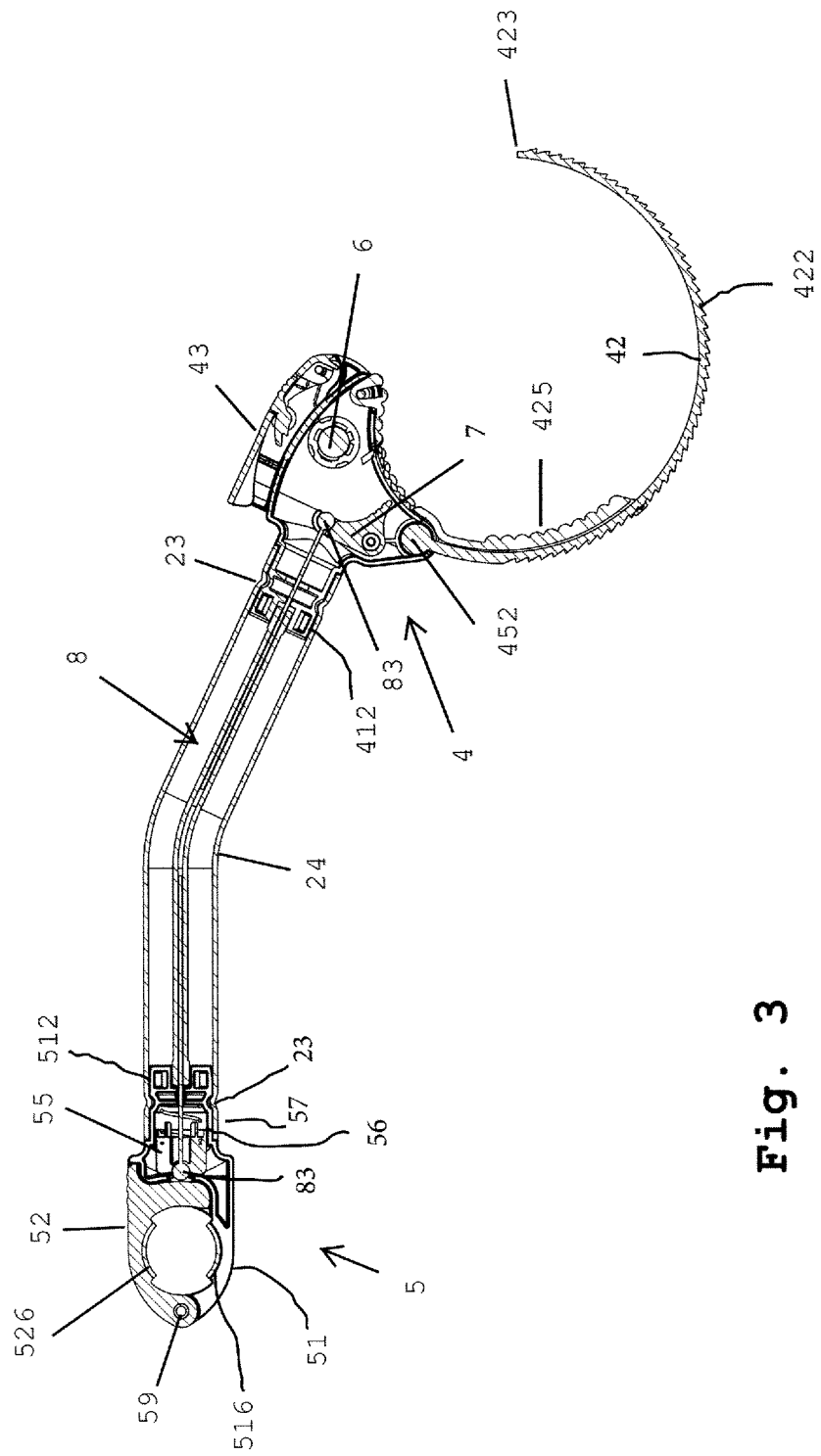
FIG. 3 is a vertical median section showing the general mechanism of a support bar.
Figure 4:
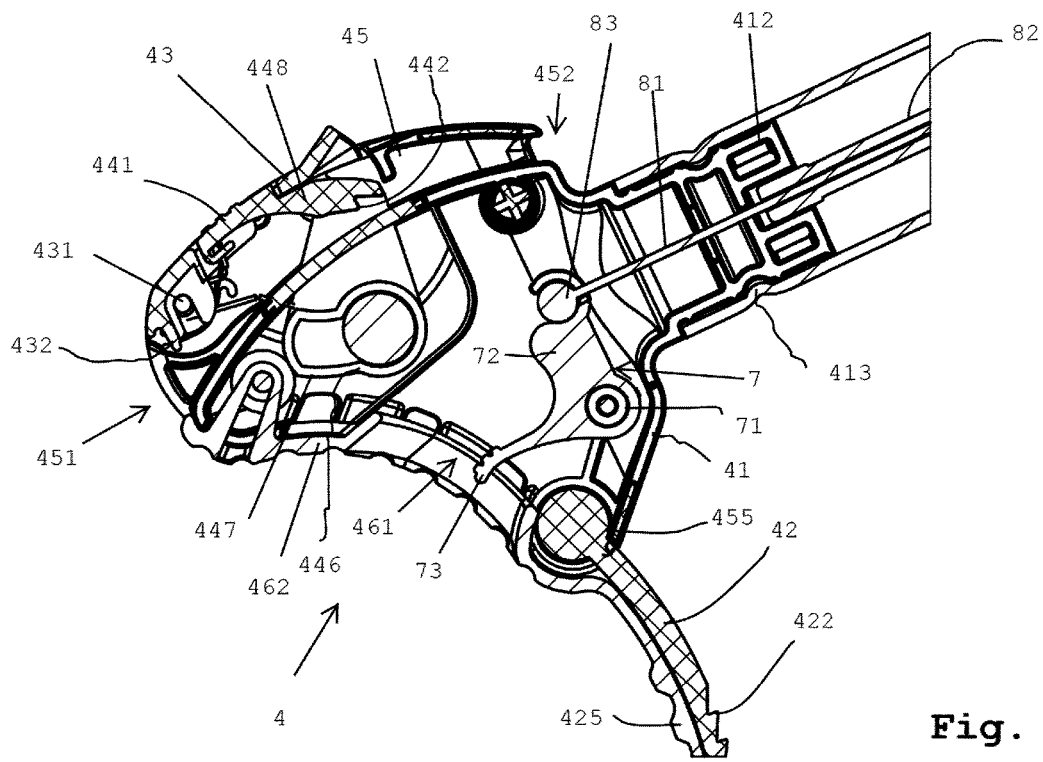
FIG. 4 is a vertical median section of a first (cycle end) grip device, from one side.
Figure 5:
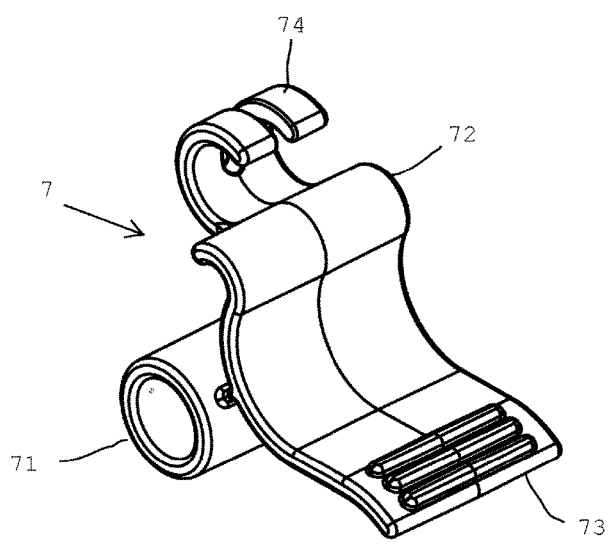
FIG. 5 shows separately an actuator element housed in the first grip device.
Figure 6:
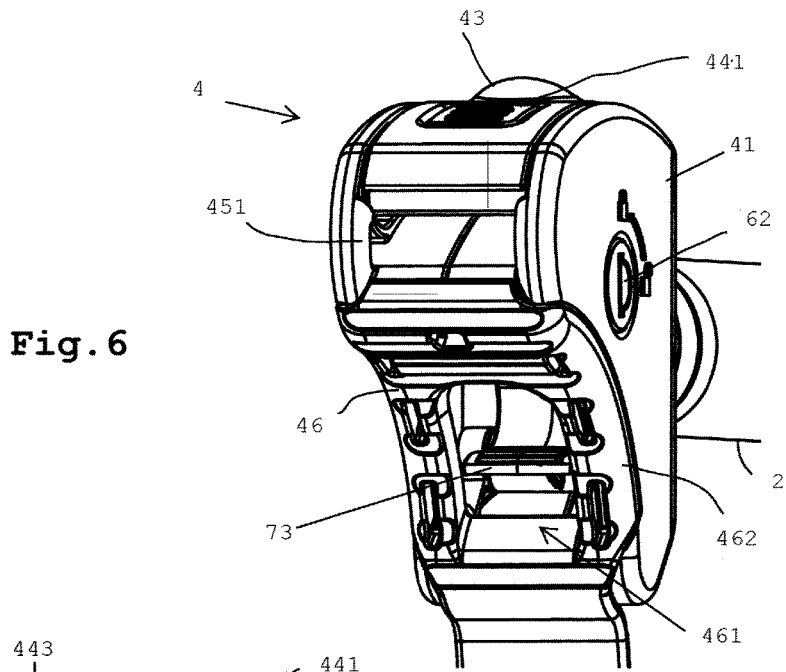
FIG. 6 is a view onto a front contact face of the first grip device.
Figure 7:
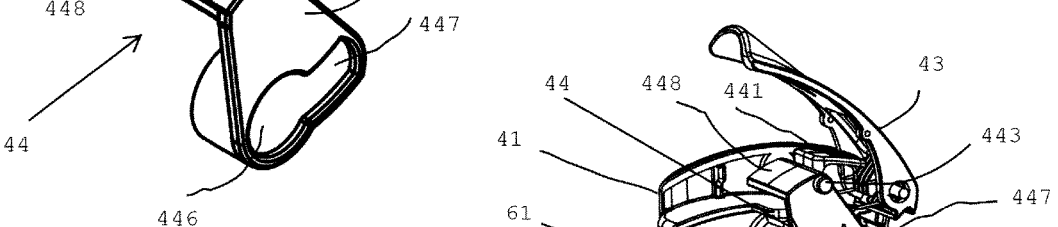
FIG. 7 shows separately a retainer element of the first grip device.
Figure 9:
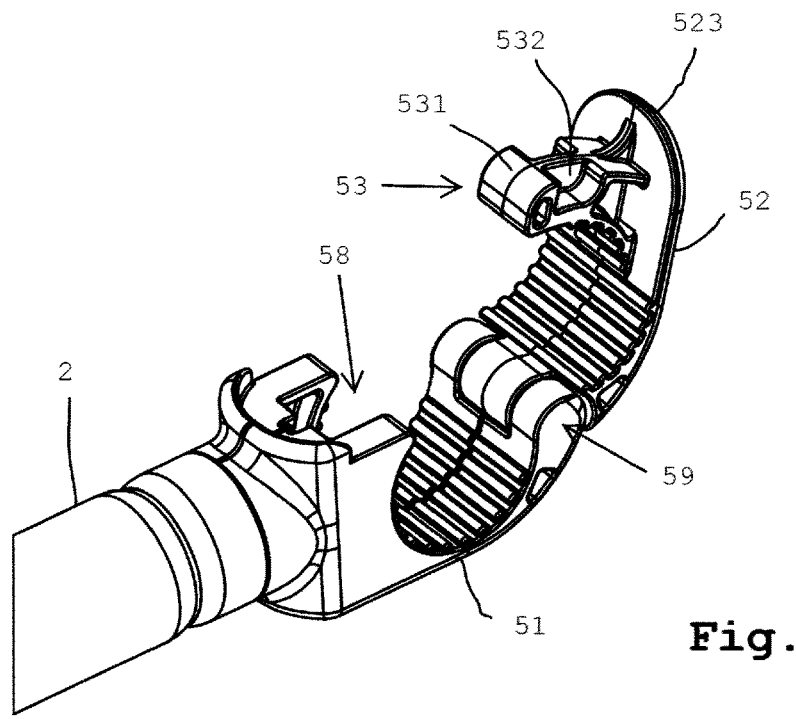
FIG. 9 is an oblique view from the bar side of a second (carrier end) grip device in an open position.

The sectional view of FIG. 9 shows an internal Bowden cable 8 extending along inside the spacer tube 2 and connecting between the first and second grip devices 4,5. This is to enable release or unlocking of the second grip device from the position of the first grip device, as will be explained below. FIG. 3 also shows how each of the grip devices 4,5 is a separate module, formed of conventional suitable tough plastics e.g. glass fibre-filled nylon, and with a respective plug connector portion 412,512 which fits into the end of the spacer tube 2 and is secured axially by means of an inward annular crimp 23 of the tube engaging an annular outward groove 413,513 (see also FIGS. 4 and 11) of the grip device connectors. These fittings allow the grip devices 4,5 to be rotated relative to the tube 2, which is important for convenience of fitting to tubes which may be at various mutual angles.

FIGS. 4 to 8 show the first (cycle) grip device in more detail. It is formed with a generally triangular housing or casing 41 defining on the front side a concave contact face 46 with a protective rubber liner member 462 for gripping conformingly onto cycle frame tubes. The device housing defines a path 45 for passage of the free end 423 of a flexible strap 42 (see also FIG. 3). The strap is anchored at a fixed end by a pivoted articulation 455 at the bottom of the casing 41, and has on its outer face a series of ratchet teeth 422. Such straps are known in themselves. We prefer to use a strap with an internal metal reinforcement. For better protection of frame tubes we also provide a rubber liner 425 extending partly around the inner face of the strap 42; this may extend integrally or continuously from the contact face liner 462.

The free end 423 of the strap 42 is inserted into the mouth 451 of the strap path 45, extends through this path beneath the tensioning lever 43 and a retaining pawl 442, and out through an exit 452 (which may be covered by a portion of the casing 41) to control the strap movement.

The retaining pawl 442 is comprised in a pivoted retaining component 44 (see FIGS. 4 and 7), comprising a pivot 443 between a front arm constituting the release button 441 and a rear arm 448 having the pawl 442 on its underside. Pivot 443 engages with the housing 41 so that withdrawal of the toothed strap 42 from the strap path 45 is prevented by the pawl 442 unless the release button 441 is pushed, pivoting the rear arm 448 and pawl 442 up and clear of the strap for withdrawal. This mechanism is broadly known in itself. The use of a strap-type grip enables snug and secure connection of a range of sizes and shapes of frame tubes without risk of damaging them.

The tensioning lever 43 is also conventional in itself, having a pivot 431 near the mouth of the strap path 451 and a downward tensioning pawl 432 (see FIG. 4) which, when the tensioning lever 43 is lifted in a tensioning stroke (against a conventional return spring) engages with the strap teeth 422 to drive the strap further into the path 45 with mechanical advantage. The tensioning lever 43 also has a window exposing the release button 441.

Figure 8:
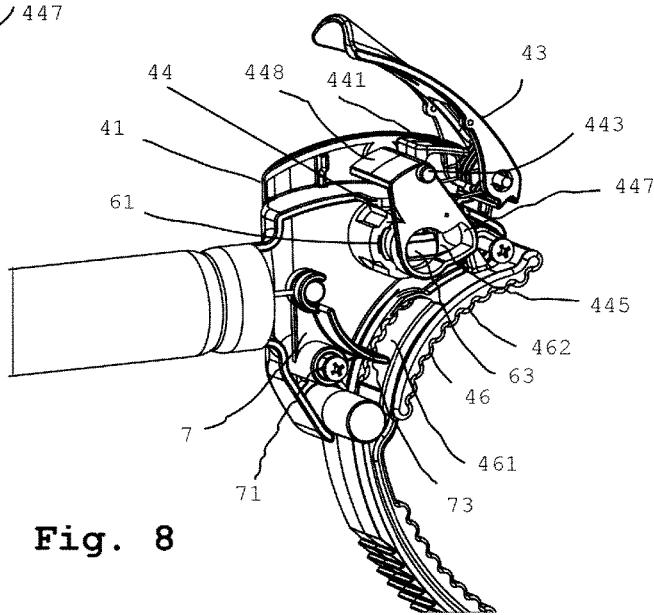
FIG. 8 is a vertical median section of the first grip device from the other side, showing a lock mechanism.

Incidentally FIGS. 3 and 8 show as an optional variant a longer construction of the tensioning lever.

The first grip device 4 is lockable, to prevent release of the strap, by means of a key-operated lock 6 with a keyhole 62 at one side of the casing 41, and a cylinder/plug extending transversely across the housing and interacting with the strap retaining component 44. Specifically, the rotatable plug 61 of the lock (the part turned by the key) carries a flat projecting lug 63 on its end (see FIG. 8). The strap retaining component 44 has a downwardly-projecting radial control flange 444 carrying an elongate control slot portion 445 with a slot having a wide end 446 and a narrow end 447, into which the end control lug 63 of the lock 6 projects. The release button 441 can be depressed (to release the strap) only if the control flange 444 can swing, and this is possible only when the lock control lug 63 is turned to align with the narrow end 447 of the control slot 445.

The first (cycle end) grip device housing 41 also accommodates a release actuator for the second (carrier end) grip at the other end of the support bar. This is to actuate the internal wire 81 of the Bowden cable 8, the outer sheath 82 of which is mounted in the insert plug 412 of the first grip housing 41 (FIG. 4) and has its retaining end enlargement 83 extending through into the interior of the housing 41. The wire end enlargement 83 is held by the cable end seat 74 of a pull arm 72 of the actuating member 7, shown separately in FIG. 5, which also has a pivot 71 connecting to the casing 41 and a forwardly-projecting actuating lever 73 which extends towards the front contact face of 46 of the first grip device. This contact face has a recess or window opening 461 (see FIGS. 4, 6 and 8) at which the actuating lever 73 of the actuating member 7 is exposed, so that it can easily be pressed down by a user's finger provided that no object is clamped in the clamp device. When an object is clamped against the contact surface by the strap the recess or access window 461 is completely covered; even its existence is not apparent. Accordingly, when the present support bar is locked to frame/cycle members at the respective ends, a third party has no means of releasing either the first grip (because it requires a key) or the second grip (because its release actuator cannot be accessed until the first grip has been opened).

Depression of the release lever 73 pivots the member 7 to pull on the inner wire 81 of the Bowden cable 8, and this pull is transmitted to the other end of the support bar and the second grip device which is now described.

The second grip device comprises a static jaw 51 and a mobile jaw 52 pivoted to it by a pivot distal to the bar 2. Like the housing 41 of the first grip device, the static part 51 of the second grip device is moulded in two mirror parts so they can house internal structures. Also the pivot pin of the pivot 59 can be fully contained, for security.

The retainer mechanism and release actuator for the second grip device are now described.

The static part 51 has a circumferentially-extending (relative to the pivot 59) catch path or latch opening 58 which receives and defines an insertion path for a projecting catch portion 53 on the end of the mobile jaw 52. Side guard pieces 581 of the static part project forward to either side of this catch path 58, and the mobile jaw 52 has an end flange 523 which fits complementarily onto an abutment surface of the static part so that in the closed condition—see FIG. 11—the join between the parts, and particularly the latch/catch elements, is masked by close-fitting joint lines of the jaw members. With a frame tube clamped in the grip device, this prevents interference with the mechanism.

The plug portion 512 of the static part 51 houses a latch mechanism, defining a longitudinal cavity constituting a shuttle path 56 for a carrier shuttle 55 having a pawl or tooth-form detent 551 at its outer end. A restoring spring 57 acting against spring seat 561 inside the static plug 512 urges the carrier shuttle 55 to its outward, locked position. The detents 551 (formed in this embodiment as a pair, to facilitate access for the end ball 84 of the cable wire 81—see FIGS. 11 and 12) have a sloping cam face 555 and a perpendicular catch face 556. Complementarily, the catch portion 53 of the mobile jaw 52 has at its tip a sloping cam face 531 followed by a perpendicular shoulder 533 and a recess 532 for the detent 551. In self-explanatory fashion, when the catch projection 53 is pushed down into the insertion path or catch path 58 the respective cam surfaces 531,555 of the catch and detents engage to push the detent shuttle 55 back against its spring, and when the shoulder 533 passes the detents 551, they spring forward again into the recesses 532, preventing reopening of the clamp 5 unless the detents are retracted. This can be done only by pressing on the actuator lever 73 exposed through the window 461 at the other end of the support bar, thereby pulling the wire 81 of the Bowden cable 8 to retract the carrier shuttle 55 against its spring, withdraw the detents and release the mobile jaw 52.

Figure 10:
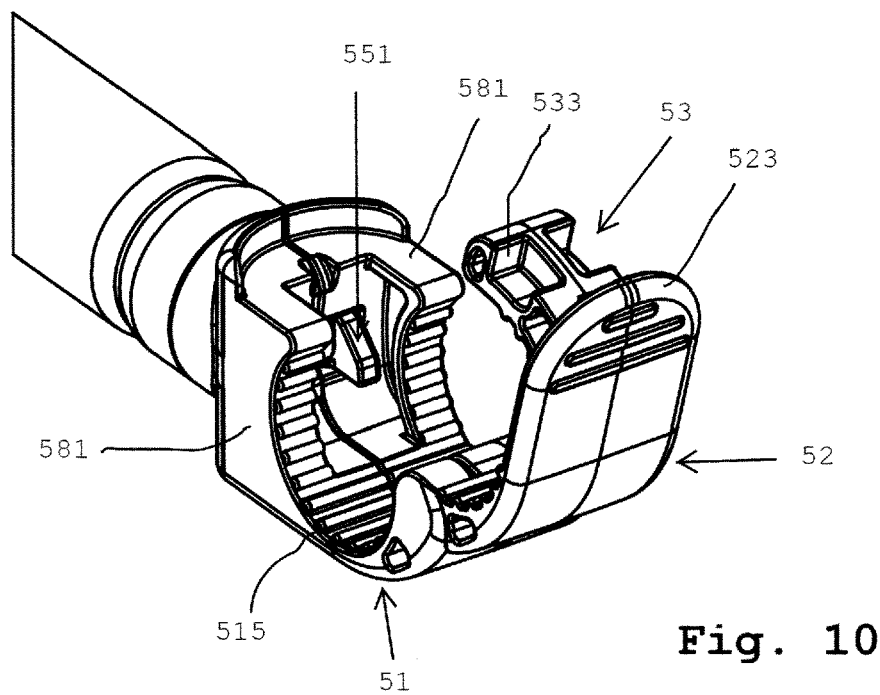
FIG. 10 is another oblique view of the open second grip device of FIG. 9, from the end side.
Figure 11:
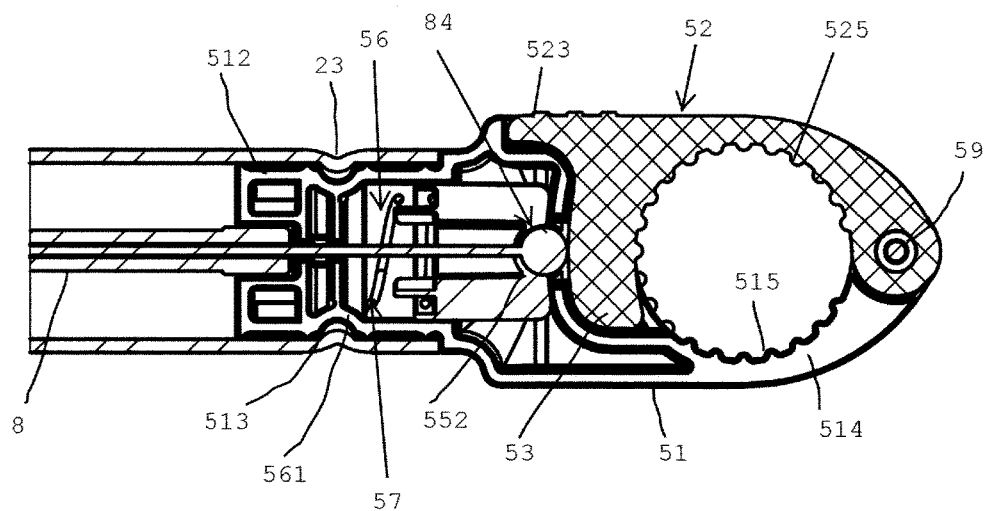
FIG. 11 is a vertical median sectional view of the second grip device of FIG. 9.
Figure 12:
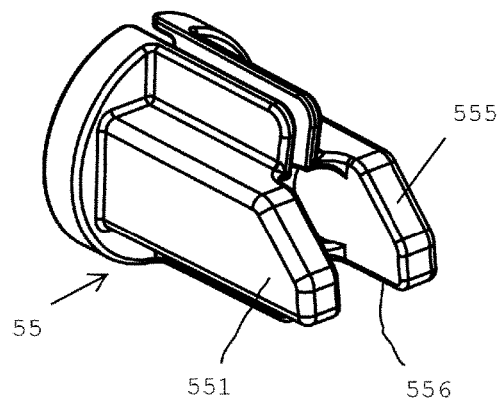
FIG. 12 shows separately a catch or detent element of the second grip device.
Figure 13:
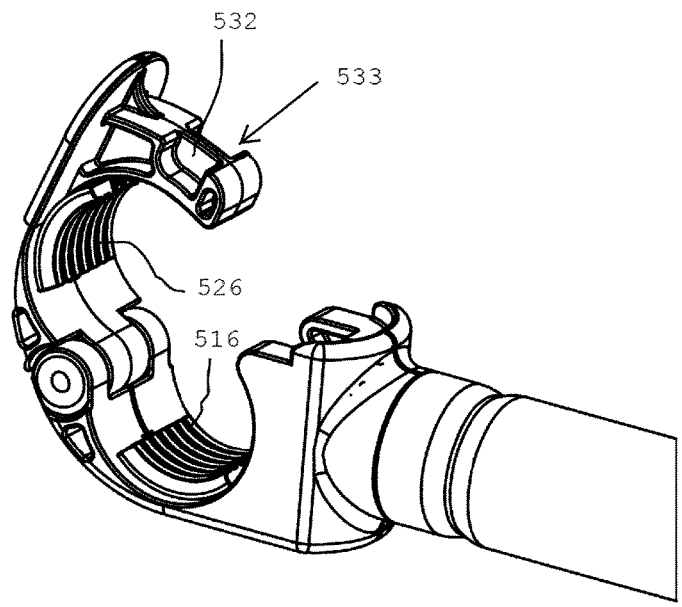
FIG. 13 is an oblique view from the bar side of a first variant version of the second grip device (showing variants also appearing in FIG. 2)

In the embodiments of FIGS. 9 to 11, the inward contact surfaces 515,525 of the static and mobile jaws 51,52 are formed with a circumferential series of contact serrations or ribs to provide a grip on the frame tube. Additionally or alternatively rubber liner segments 516,526 could be included in the clamp as shown in the constructions of FIGS. 3 and 13, which are a variant in this respect.

Figure 14:
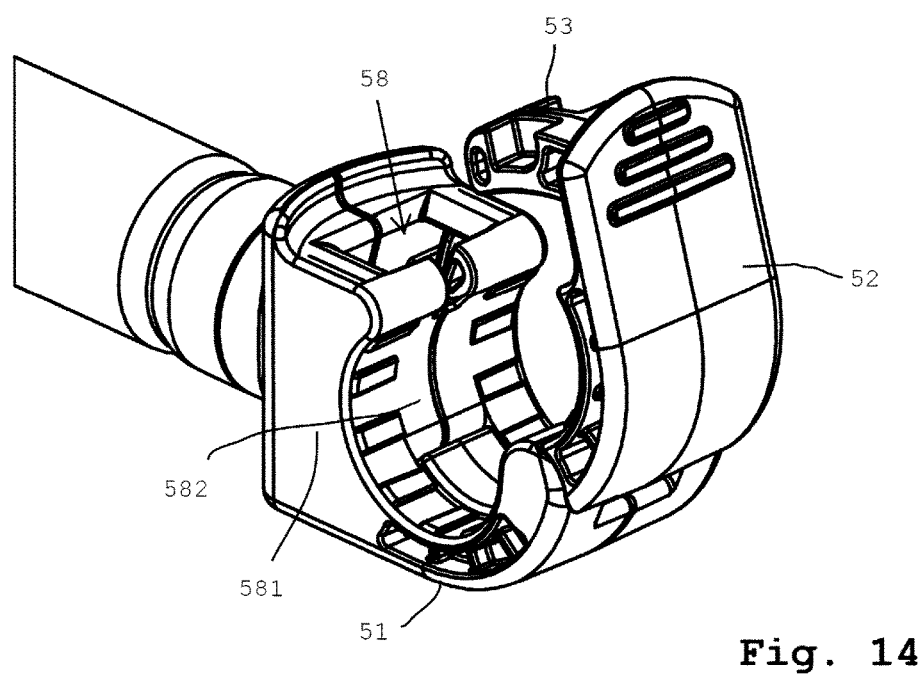
FIG. 14 is an oblique view of a second variant of the second grip device, open and from the end side.

FIG. 14 shows a further variant of the second grip device. The mobile and static jaws 52,51 are similar to previous embodiments. However the side guard pieces 581 of the static part 51 are extended medially inwards at their distal edges to form a distal wall for the insertion path 58, between the insertion path and the cavity that holds the carrier tube. The catch path 58 is thereby enclosed on all sides and more highly resistant to forcible withdrawal of the catch portion 53 while locked.

The ball end 83 of the Bowden cable can rotate relative to the detent carriage 55, avoiding the accumulation of twists in the cable if the clamp devices are rotated.

The presently-disclosed support bars provide a marked improvement over known support bars in enabling a combination of secure locking of both clamps by a single lock action, as well as a sympathetic strap-type clamp at the cycle end. The key for operating the lock may be the same as the key for locking a cycle carrier as a whole relative to a carrying vehicle, e.g. onto its towbar.

The invention claimed is:

1. A support bar comprising:
a first grip device, a second grip device and a spacer bar to which the first and second grip devices are fixed at a longitudinal spacing;
each of said first and second grip devices comprising:
one or more relatively movable grip elements movable between closed and open conditions of the grip device;
a respective retainer mechanism engageable with one or more of said grip elements to keep the grip device in a closed condition; and
a respective release actuator operable to disengage the retainer mechanism for opening of the respective grip device;
wherein the release actuator of the second grip device comprises an elongate slider element extending along inside the spacer bar and a release actuator member for opening the second grip device, connected to the elongate slider element at a position remote from the retainer mechanism of the second grip device, and
wherein the release actuator member for opening the second grip device is covered by the first grip device when the first grip device is in the closed condition and engaged with a gripped object.

2. The support bar according to claim 1, wherein the release actuator member of the second grip device is operable to pull on the elongate slider element.

3. The support bar according to claim 1, wherein the release actuator member of the second grip device comprises a lever, push button or pull tag connected to the elongate slider element.

4. The support bar according to claim 1, wherein the release actuator member of the second grip device is positioned at the first grip device.

5. The support bar according to claim 1, wherein
the second grip device comprises a movable clamp element comprising a catch portion;
the retainer mechanism for the second grip device includes a movable detent member drivable by the release actuator member of the second grip device, the detent member being engageable at a detent location with the catch portion of the movable clamp element in the closed condition of the second grip device to hold it closed.

6. The support bar according to claim 5, wherein the detent location is in line with an axis of the spacer bar.

7. The support bar according to claim 5, wherein the movable clamp element of the second grip device is pivoted to a static element which defines an insertion path including the detent location, and the movable clamp element has a free end comprising said catch portion which is engageable in the insertion path.

8. The support bar according to claim 7, wherein the insertion path is enclosed between side guard portions of the second grip device.

9. The support bar according to claim 1, wherein
the second grip device further comprises a movable clamp element pivoted to a static clamp element at a pivot distal from the spacer bar;
the static clamp element defines a catch path having a detent location;
the movable clamp element has a free end which comprises a catch portion engageable in the catch path;
the retaining mechanism for the second grip device includes a detent member drivable in the longitudinal direction of the spacer tube by the release actuator of the second grip device, the detent member being engageable in the closed condition of the second grip device with the catch portion of the movable clamp element at the detent location.

10. The support bar according to claim 1, wherein the elongate slider element is a flexible cable element.

11. The support bar according to claim 10, wherein the flexible cable element is comprised in a Bowden cable extending along inside the spacer bar.

12. The support bar according to claim 1, further comprising a security lock mechanism operable to prevent opening of the first grip device.

13. The support bar according to claim 1, wherein the first grip device has a fixed grip contact surface opposed by said movable grip element the fixed grip contact surface being interrupted by a recess and the release actuator for the second grip device being housed in said recess.

14. The support bar according to claim 13, wherein the grip contact surface is a concave surface and surrounds the recess.

15. The support bar according to claim 1, wherein said movable grip element of the first grip device is a strap.

16. The support bar according to claim 15, wherein the strap comprises a longitudinal series of recesses;
the first grip device comprises a fixed housing portion defining a control opening through which the strap can pass, and
the retaining mechanism of the first grip device comprises a toothed element to engage the strap recesses and a holding element to hold the toothed element in engagement with the strap.

17. A support bar comprising a first grip device, a second grip device and a spacer bar to which the first and second grip devices are fixed at a longitudinal spacing;
the first grip device comprising a housing, a flexible strap as a movable grip element and a lockable mechanism for holding a loop of the strap at any of a range of possible lengths;
the second grip device comprising a movable clamp element, pivoted to a static clamp element at a pivot distal from the spacer bar, a free end of the movable clamp element comprising a catch portion;
the second grip device further defining an enclosed detent location proximal to the spacer bar and the catch portion of the movable clamp element being releasably engageable at the detent location when the movable clamp element is moved to a closed position of the second grip device;
a retainer mechanism of the second grip device comprising a detent member engageable with the catch portion of the movable clamp element to prevent its withdrawal from the detent location, thereby holding the second grip device in a closed condition, said detent member being mounted in the second grip device for longitudinal movement between a retracted condition and an advanced condition relative to the spacer bar, and
a release actuator for the second grip device comprising an actuating cable mechanism extending along inside the spacer bar between the first and second grip devices, the actuating cable mechanism comprising an actuating wire connected at a first end to an actuator housed in the housing of the first grip device and at a second end to said detent member of the retainer mechanism of the second grip device, said actuator being operable to pull on the actuating wire, retract the detent member and thereby release the movable clamp element of the second grip device.

18. The support bar according to claim 17, wherein the first grip device comprises a grip contact surface and the actuator for the actuating wire is accessible at an access opening provided in the grip contact surface.

19. The support bar according claim 17, wherein the spacer bar has a bent or curved form in the longitudinal direction.

20. A cycle carrier comprising a carrier frame and one or more support bars as defined in claim 17.

21. The cycle carrier as defined in claim 20, wherein the carrier frame of the cycle carrier comprises wheel supports and an upstanding frame support portion, the frame support portion including a frame portion to which said one or more support bars is connectable by the second grip device thereof.

* * * * *